United States Patent Office 2,757,487
Patented Aug. 7, 1956

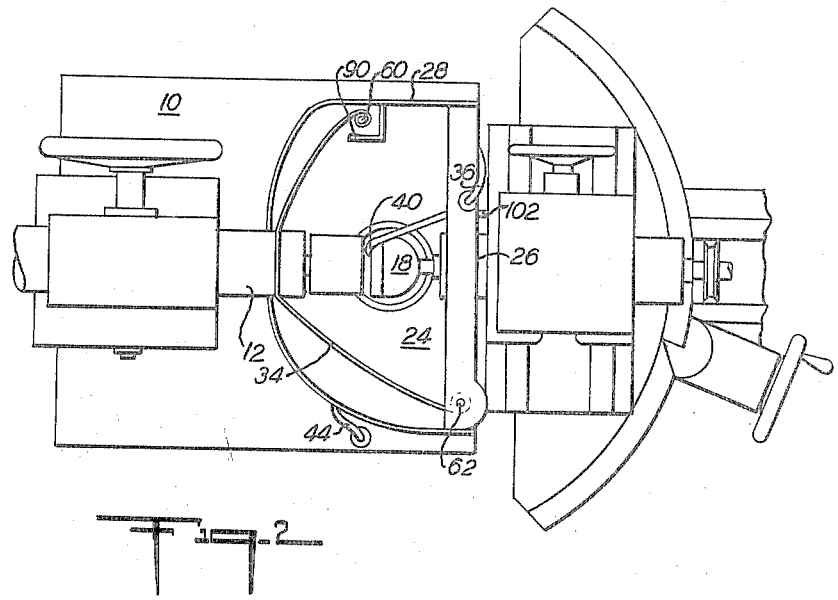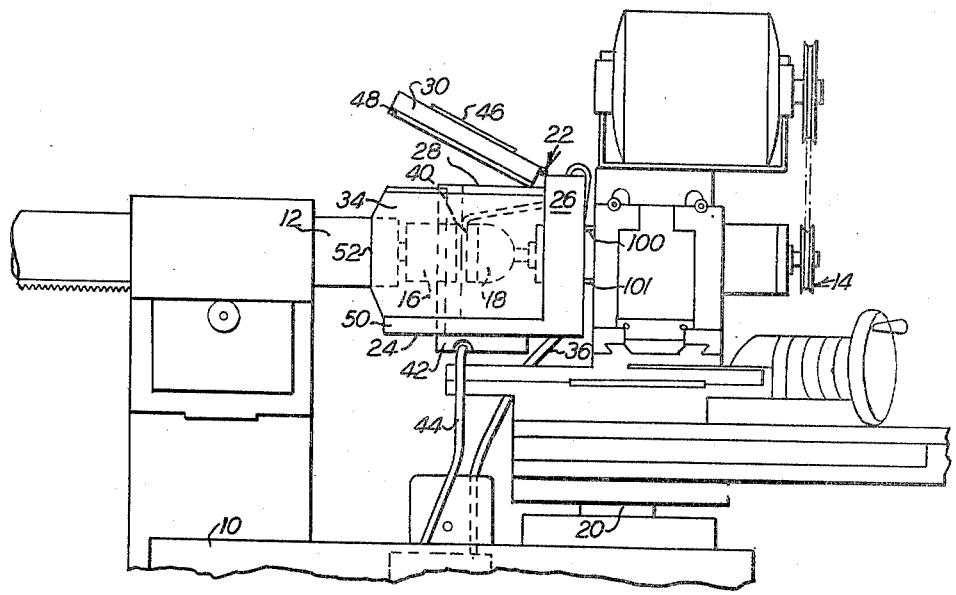

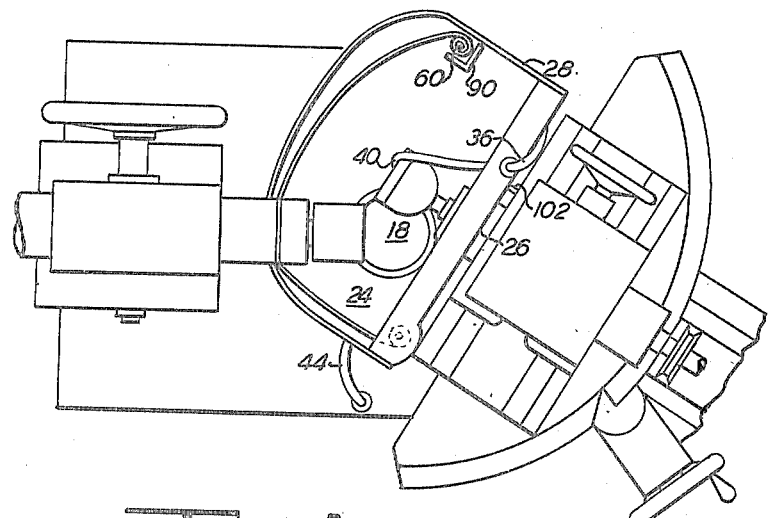
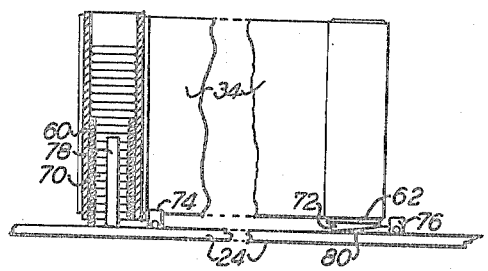

2,757,487

COOLING SYSTEMS FOR LENS GRINDERS

Orin W. Coburn, Muskogee, Okla.

Application June 23, 1954, Serial No. 438,755

10 Claims. (Cl. 51—33)

This invention relates to improved means for cooling grinding machines in general and particularly to a cooling system which includes a splatterproof housing for the tool and workpiece of lens grinders of the type disclosed and claimed in my co-pending application Serial No. 413,765 filed March 3, 1954.

In general, lens grinding devices of that type comprise a cup-shaped cutting tool mounted on a tool-holding assembly, a work holding chuck mounted on a tailstock, a working pivot for the tool-holding assembly and means for adjusting the position of the tool and the position of the tailstock. In operation the tool-holding assembly reciprocates the tool about the working pivot and grinds a lens fixed in the tailstock chuck. After each reciprocation the tailstock may be adjusted to move the workpiece into position for another cut.

To obtain high production speed from this high speed lens grinding unit, it is necessary to maintain some means for cooling the cup-shaped cutting tool often referred to as the "diamond."

It is an object of the present invention to provide means for supplying liquid coolant to these lens grinders without the usual problems of coolant loss and splattering.

It is also an object of this invention to provide means for maintaining a splatterproof housing around a longitudinally extending tool holder and a longitudinally extending work holder, one of which lies in a fixed longitudinal position, while the other is reciprocated with respect thereto. Other objects of the invention will be obvious from the detailed description of the invention and the attached drawings.

In general, the objects of the invention are accomplished by a housing assembly and a cooling circulating system wherein the housing assembly comprises a box mounted on a reciprocating member for housing both the tool and the workpiece in all grinding positions of both, the side of the housing nearest the longitudinally stationary holder is cut away and replaced by a flexible sheet provided with means for fitting it on the stationary holder in splatter-tight relationship and further provided with torsion reels, one mounted at each end thereof for closing the cut away portion of said housing; and wherein the cooling circulating system includes a pump, flexible supply pipe leading from the pump into the housing for applying coolant directly to the tool and a flexible return pipe extending from the bottom of the housing to the feed reservoir for the pump.

A "torsion reel," as referred to herein, means a roll mounted to rotate for winding or unwinding sheet material wound thereon in which spring means, usually a torsion spring mounted within the roller, continually biases the roll in a winding direction. The torsion reels are very important in this invention and two reels are used, one at each end of a flexible sheet so that there is always spring pressure tending to wind the flexible sheet on each torsion reel. The significance of this construction will be more apparent in the detailed description of the invention below.

The invention will be better understood by reference to the attached drawings illustrating one preferred form of the invention in which Fig. 1 is a side elevation of a lens grinder equipped with the cooling system of the present invention;

Fig. 2 is a plan view of the same unit with the top removed to more fully illustrate the working relationship of the various elements of the invention.

Fig. 3 is a diagrammatic representation of the position of the various elements of the invention in one extreme position of tool reciprocation; and Fig. 4 is an exploded view of the torsion reels.

Referring to the drawings, Figs. 1 and 2, it will be seen that the lens grinding machine includes a base 10, a tailstock 12 and a tool-holding assembly indicated generally at 14.

Mounted in the tailstock 12 is a workpiece 16 held in a suitable chuck not shown, and mounted on the tool holding assembly is a rotary grinding tool 18. The tool holding assembly 14 is pivoted about pivot pin 20 for reciprocating the grinding tool and forming the lens. Details of the adjusting mechanisms of the tool holding assembly form no part of this invention and will not be described here.

A cooling apparatus for the lens grinder includes a splatterproof housing indicated generally at 22. The housing includes a rigid sheet metal box having a base 24, a back 26, a side 28, and a hinged top 30. The front and one side of the box are formed of a flexible sheet of semi-transparent oil-resistant plastic 34. The plastic is about ⅛" thick and has enough rigidity to hold its shape.

The box 22 is mounted on the tool holding assembly by means of screw bolts 100, 101, and 102, and it will be noted that the guard is so mounted that it is always in the same relation to the grinding tool, regardless of the adjustment of the tool holding assembly. The back 26 is formed with an aperture, not shown, which fits the tool holder. If desired, a fitting gasket can be used to assure no leakage.

A pump (not shown) is positioned in the base of the lens grinder and is synchronized so that it will operate only when the grinder is in operation. An oil reservoir (not shown) is positioned adjacent the pump for supplying a coolant. A supply pipe 36 extends from the pump to a nozzle 40 positioned inside the housing 22 for directing cool oil onto the cutting face of the tool 18. The cooling oil is then collected in the housing where it drains into a sump 42 and is returned to the reservoir through pipe 44 by gravitational flow.

The hinged top 30 is provided with a glass panel 46 which permits an operator to observe the grinding operation with the housing closed. The top is further provided with a dependent rim 48 which overlaps the sides to assure a splatterproof connection between the flexible sheet 34 and the top. A corresponding upstanding rim 50 is provided on the base 24 for the same purpose.

The flexible sheet 34 extends between the open end of side 28 and the open end of back 26. The sheet is provided with aperture 52 which is large enough to fit the tailstock in a substantially splatter-tight relationship.

A pair of torsion reels 60 and 62 are mounted on the base 24 and each carries one end of the flexible sheet 34. A part of the flexible sheet is wound on each of the torsion reels in every position of reciprocation of the tool 18 during grinding. A shield 90 protects reel 60 from direct splattering of the cooling oil and a similar shield, not shown, protects reel 62. Torsion springs 70 and 72 (Fig. 4) in reels 60 and 62, respectively, are connected between studs 74 and 76, respectively, of the base 24 and the holes 78 and 80, respectively, of the reels. Reel 60 is wound counter-clockwise prior to attaching the flexible strip 34 so that it will continuously bias the reel in a clockwise direction, which is the winding direction. Likewise, reel 80 is turned in a clockwise direction, so that spring 72 is continuously biasing roll 62 in a counterclockwise direction, which is the winding direction.

Thus in operation the tailstock and the tool holding assembly are separated, a proper grinding tool is placed on the tool holding assembly, and a workpiece is fixed on the tailstock. The tool holding assembly is then adjusted and the tailstock is moved in the direction of the workpiece until it is properly positioned for the first cut. At this time the flexible sheet 34 is slid onto the tailstock 12; the cover 30 is lowered to close the housing; and, the main switch, not shown, is thrown to start the grinding machine and the cooling pump. As the tool holding assembly is pivoted to bring the diamond into contact with the workpiece, the flexible sheet will be unwound from one torsion reel and wound onto another. Thus in Fig. 1 most of the flexible sheet is wound onto reel 60, whereas in Fig. 3 most of the flexible sheet is wound on reel 62; yet in both instances the flexible sheet remains in the same relative position with respect to tailstock 12. It will be seen that by this construction a splatterproof housing is maintained for with two relatively movable units.

I claim:

1. A splatter guard for a grinding machine which includes a stationary member and a pivotally mounted member in operative engagement with one another comprising a rigid guard box mounted on first one of said members and surrounding it at the point of engagement with the other member, said box including a bottom, a back apertured for receiving said first member, one side, a movable top and a flexible shield forming the front and other side of said box, said flexible shield being apertured at about its center for mounting it on said other member and said shield being mounted on said box by means of torsion reels, one adjacent the open end of said back and the other adjacent the open end of said rigid side.

2. A splatter guard for a grinding machine which includes a stationary member and a pivotally mounted member in operative engagement with one another comprising a rigid guard box mounted on the pivotally mounted member and surrounding it at the point of engagement with the other member, said box including a bottom, provided with a collection sump a back apertured for receiving said pivotally mounted member one side, a hinged top, a flexible shield forming the front and other side of said box, said flexible shield being apertured at about its center for mounting it on said stationary member and said shield being mounted on said box by means of torsion reels, one adjacent the open end of said back and the other adjacent the open end of said rigid side, and rim guards on said top and bottom for forming a splatter tight joint with said flexible member.

3. A splatter guard for a grinding machine which includes a stationary member and a pivotally mounted member in operative engagement with one another comprising a rigid guard box mounted on a first one of said members and surrounding it at the point of engagement with the other member, said box being provided with a wide arc open front and a flexible shield closing said front, said flexible shield being apertured at about its center for mounting it on said other member and said shield being mounted on said box by means of torsion reels, one at each end of said opening.

4. A splatter guard for a lens grinding machine which includes a stationary work piece on a tailstock and a pivotally mounted grinding tool on a tool holder comprising a rigid guard box adapted to be on a tool holder for the tool at the point of engagement with the workpiece, said box including a bottom, a back apertured for receiving said first member, one side and a movable top, a flexible shield forming the front and other side of said box, said flexible shield being apertured at about its center for mounting it on said other member and said shield being mounted on said box by means of torsion reels, one adjacent the open end of said back and the other adjacent the open end of said rigid side.

5. A splatter guard adapted for use on a grinding machine which includes a stationary member and a pivotally mounted member in operative engagement with one another comprising a rigid guard box adapted to be mounted on a first one of said members for surrounding it at the point of engagement with the other member, said box being provided with a wide arc front opening and a hinged top, a flexible shield for closing said opening, said flexible shield being apertured at about its center for mounting it on said other member and said shield being mounted on said box by means of torsion reels, one adjacent each end of said opening.

6. A cooling system for a lens grinding machine and the like wherein a stationary tailstock mounts a workpiece and a rotary tool is reciprocated about a pivot point for grinding said lens, comprising a box surrounding said rotary tool, said box being formed with the end adjacent the tailstock and at least a part of one side thereof cut away and being provided with a hinged top, a flexible sheet of material wound on two torsion reels, one at each end of the cut away portion of the box, said sheet being provided with an opening for engaging said tailstock, means for applying cooling oil directly to said rotary tool, a pump for bringing cooling material to said applying means, and means at the bottom of said box for collecting and returning coolant to said pump.

7. A cooling system for a lens grinding machine and the like wherein a stationary tailstock mounts a workpiece and a rotary tool is reciprocated about a pivot point for grinding said lens, comprising a box surrounding said rotary tool, said box being formed with the end adjacent the tailstock and at least a part of one side thereof cut away and being provided with a hinged top, a flexible sheet of material wound on two torsion reels, one at each end of the cut away portion of the box, said sheet being provided with an opening for engaging said tailstock, means for applying cooling oil directly to said rotary tool, a pump for bringing cooling material to said applying means, means at the bottom of said box for collecting and returning coolant to said pump and guide means on the bottom and top of said box for making a substantially splatterproof housing joint between the box and the flexible member.

8. A cooling system for a lens grinding machine and the like wherein a stationary tailstock mounts a workpiece and a rotary tool is reciprocated about a pivot point for grinding said lens, comprising a box surrounding said rotary tool, said box being formed with a flexible sheet of material closing the front thereof, said sheet being provided with an opening for engaging said tailstock, means for winding one end of said sheet and unwinding the other end as said tool is pivoted, means for applying cooling oil directly to said rotary tool, and means at the bottom of said box for collecting cooling oil.

9. A cooling system for a lens grinding machine and the like wherein a stationary tailstock mounts a workpiece and a rotary tool is reciprocated about a pivot point for grinding said lens, comprising a housing surrounding said rotary tool and the workpiece, said housing being provided with a hinged top and two parts one adapted to be fixed on the work holder and one adapted to be fixed on the tool holder, means for applying cooling liquid directly to said rotary tool, and means at the bottom of said housing for collecting said cooling liquid, said parts being relatively movable during pivoting and being joined in substantially splatter-proof relation in all positions of the pivoting movement.

10. A splatter guard for a grinding machine which includes a stationary member and a pivotally mounted member in operative engagement with one another comprising a housing adapted to be mounted on a first one of said members surrounding it at the point of engagement with the other member, said housing including a section apertured for mounting it on said other member and said section being movable in said housing while maintaining a splatter-proof seal.

References Cited in the file of this patent

UNITED STATES PATENTS

| | | |
|---|---|---|
| 2,548,418 | Bernheim | Apr. 10, 1951 |
| 2,589,488 | Fowler | Mar. 18, 1952 |
| 2,616,226 | D'Avaucourt | Nov. 4, 1952 |
| 2,633,675 | Ellis | Apr. 7, 1953 |